United States Patent [19]
Holland

[11] 3,741,610
[45] June 26, 1973

[54] VARIABLE RATIO PROPORTIONING DEVICE

[76] Inventor: Harvison C. Holland, 230 22nd St., Santa Monica, Calif. 90402

[22] Filed: July 13, 1970

[21] Appl. No.: 54,206

[52] U.S. Cl. .............................. 303/6 C, 303/24 F
[51] Int. Cl. ............................................ B60t 8/26
[58] Field of Search ................... 303/6 A, 6 C, 13, 303/24 C, 24 F, 28, 40, 57, 61, 86, 21 CG, 24 A

[56] References Cited
UNITED STATES PATENTS

| | | | |
|---|---|---|---|
| 3,022,115 | 2/1962 | Hill et al. .......................... | 303/24 A |
| 3,317,251 | 5/1967 | Hambling et al. ................. | 303/24 A |
| 3,403,946 | 10/1968 | Thirion ............................ | 303/21 CG X |
| 3,231,315 | 1/1966 | Turnbull .......................... | 303/61 |
| 3,530,670 | 9/1970 | Fay .................................. | 303/6 C X |
| 3,539,228 | 11/1970 | Smith .............................. | 303/40 |
| 3,545,814 | 12/1970 | Margetts ......................... | 303/6 C |

Primary Examiner—Duane A. Reger
Attorney—Wolfe, Hubbard, Leydig, Voit & Osann

[57] ABSTRACT

A proportioning device for producing a modulated outlet pressure which varies as a predetermined non-linear function of inlet pressure. A pair of opposed pistons are subjected to inlet and outlet pressures respectively and actuate a two-way valve for admitting pressure fluid to the outlet and permitting its return to the inlet. The forces on the pistons include pressure forces and also a biasing force whose value is determined by a third piston subjected to inlet pressure acting on the opposed pistons through a system of levers, a cam, and a spring.

13 Claims, 6 Drawing Figures

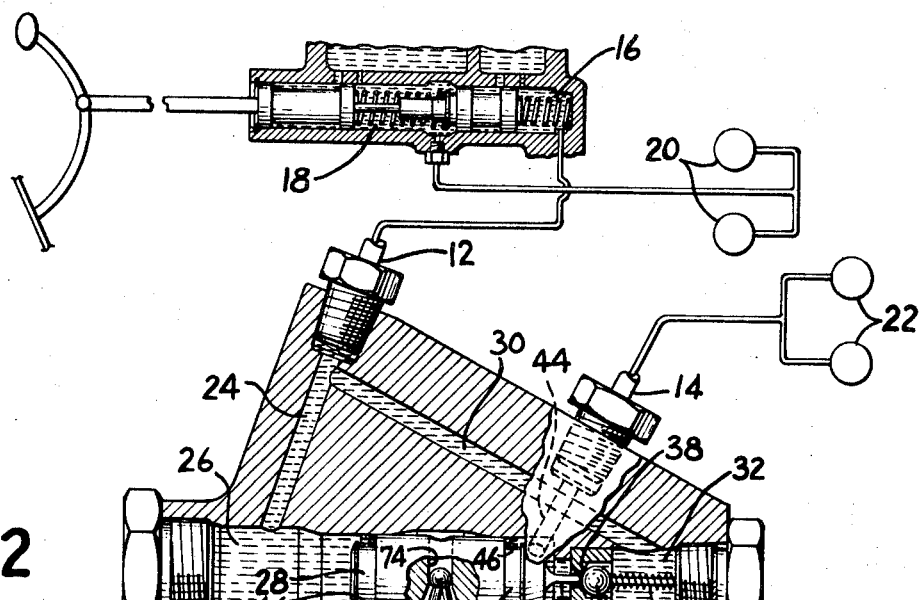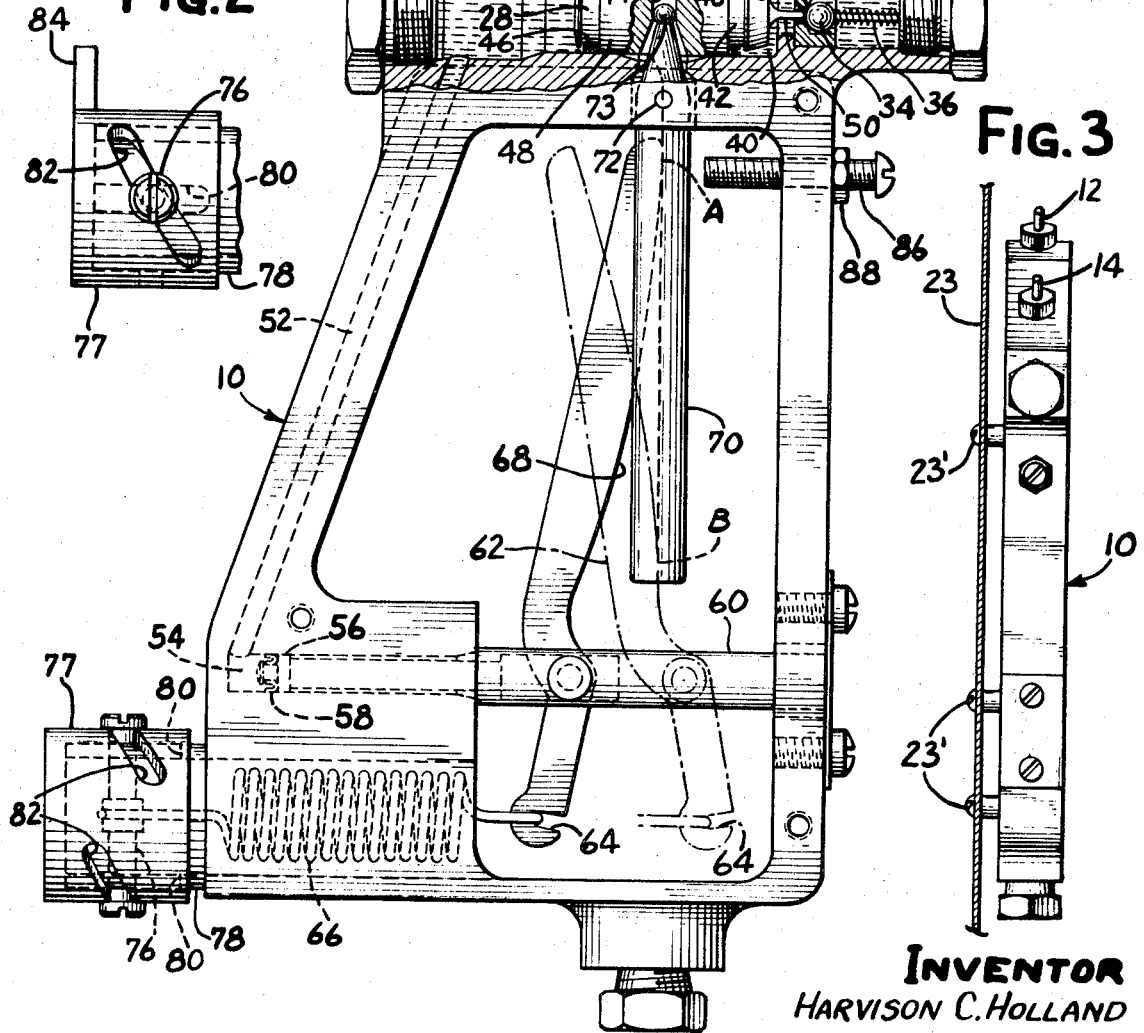

INVENTOR
HARVISON C. HOLLAND
by: Wolfe, Hubbard, Leydig, Voit & Osann
ATTYS.

VARIABLE RATIO PROPORTIONING DEVICE

DESCRIPTION OF THE INVENTION

The present invention relates to proportioning devices, and in its principal aspect concerns a device for controlling outlet fluid pressure as a predetermined non-linear function of inlet pressure.

A principal object of the present invention is to provide a proportioning device which is effective to provide a predetermined proportioning function which is not dependent on a simple constant differential, or a fixed ratio of pressures, but which will vary the proportioning effect according to a predetermined function of input pressure which is non-linear. In addition, the function may be discontinuous at certain points, if required.

Another object is to provide such a device in which the proportioning ratio is a non-linear function of input pressure as determined by a spring and a cam shaped lever whose profile is determined by the fluid pressure requirements of the system. A related object is to provide a proportioning device in which a variable biasing force is effective to change the proportioning ratio.

In greater detail, it is an object of the present invention to provide a proportioning device for use in a motor vehicle in which the ratio of braking effect between front and rear wheels must be varied according to different operating conditions in order to achieve the maximum overall braking effect under differing conditions of tire-road adhesion and vehicle loading without wheel locking and consequent loss of control. A device constructed in accordance with the present invention is intended to take into account tire adhesion to the road surface and vehicle weight-transfer and wheel brake mechanism characteristics during deceleration to program optimum proportioning of braking force for maximum vehicle deceleration under all road conditions.

Other objects and advantages of the invention will become apparent upon reading the following detailed specification and upon reference to the drawings in which:

FIG. 1 is a sectional side elevation of a variable ratio proportioning device exemplifying the present invention connected in an automotive vehicle braking system;

FIG. 2 is a fragmentary plan view of the bias spring adjusting means of the device of FIG. 1;

FIG. 3 is a vertical side elevation on a reduced scale of the device taken from the right side of FIG. 1;

Figure 4:
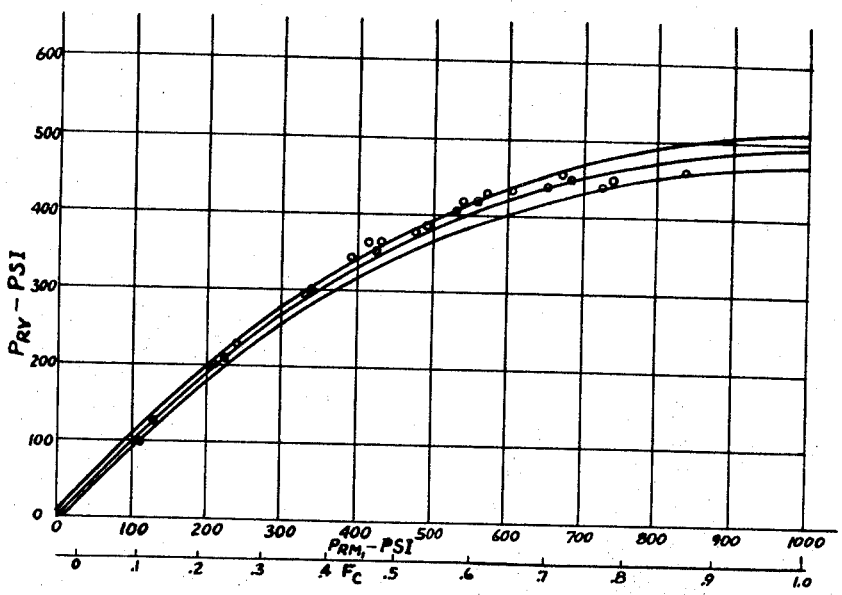
FIG. 4 is a graph showing both design and performance input vs. output pressure curves for a device constructed as shown in FIGS. 1-3.

Although the device of the present invention is shown in connection with particular exemplary embodiments, it should be understood that the invention is not to be so limited to the particular embodiments shown and described herein, but is on the contrary applicable to all applications and uses in which a proportioning device is required to distribute pressure according to a predetermined non-linear function of input pressure, rather than in a simple fixed ratio or with a constant pressure differential as with prior art designs. While the device of the present invention is capable of producing such results, its advantageous features are best utilized in providing a proportioning function which follows a complex relationship with inlet pressure.

The device of the present invention is most advantageously used in connection with a motor vehicle (not shown) having front and rear wheels, each set of wheels being equipped with brakes hydraulically actuated by means for generating hydraulic pressure. In a conventional automobile having four wheels, with brakes at front and rear, it can be shown that for each distribution of disposable load there is only one optimum ratio of braking forces between front and rear for a given coefficient of friction between the tires and the road which will provide maximum deceleration and that this optimum ratio varies with changes in coefficient of friction in a non-linear manner.

The braking force obtainable from the front wheels is enhanced during braking due to the weight-transfer effect which tends to increase the downward force at the front wheels and lessen the force at the rear wheels even though the total downward force of the vehicle on its wheels is the same as when standing still. Since the maximum braking force obtainable from a given wheel is equal to the downward force on the wheel times the coefficient of friction between the tire and the road, it can be seen that the front wheels can provide a greater proportion of the total braking force, and the rear wheels a lesser proportion as the maximum adhesion obtainable between the tires and the road increases.

For any distribution of disposable load in the vehicle, at each coefficient of friction between the tire and the road, there is a single value of braking force that can be applied to the front and a corresponding value of braking force that can be applied to the rear wheels to achieve maximum deceleration of the vehicle without resulting loss of adhesion between the tires and the road with resulting skidding coupled with the possibility of loss of control. Under dry, paved road conditions the ratio of front-to-rear braking force is at a maximum. Under other conditions, such as on wet pavement or ice, a lower coefficient of friction will be observed, resulting in different weight-transfer effect and, consequently, different distribution of downward tire forces between front and rear, even though the total downward force of the vehicle remains the same. It can, therefore, be seen that the proportioning of braking force between front and rear which is most effective under one condition will not be correct for another condition where a different coefficient of friction is encountered. If a braking system is set up to proportion front-to-rear forces to give maximum braking under maximum tire-road friction conditions, with a relatively larger proportion of braking force applied to the front wheels, the use of the same ratio under low friction conditions such as on ice covered pavement will result in an excessive proportion of braking force at the front wheels and consequent underutilization on the rear wheels or sliding or skidding of the front wheels before the rear wheels are utilized to maximum braking effect. On the other hand, if the fixed proportion is set up to favor lower friction conditions, then an attempted maximum stop under more favorable friction conditions will result in exceeding the adhesion capability of the rear tires by producing a greater proportion of braking force than they can accommmodate without skidding. This results not only in more than the optimum stopping distance for the vehicle, but also increases the danger of losing control of the vehicle because the skidding rear wheels will tend to induce a spin.

In modern passenger automotive vehicles hydraulic brakes are used exclusively. By the simultaneous application of fluid pressure from a master cylinder to individual slave cylinders in the brake mechanism of each wheel, the brakes are applied concurrently providing equal or directly proportional braking forces at the front and rear wheels depending upon the relative size of the front and rear slave cylinders. It is also common practice to separate the hydraulic systems between front and rear to assure the operation of one pair of brakes in case the other hydraulic system fails. However, in these split systems, mechanical interconnection of the two hydraulic systems is provided to assure substantially equal front and rear pressures. Occasionally pressure limiting devices and other means have been inserted in the rear brake system to limit maximum rear brake system pressure, or otherwise modify the front to rear braking force relationship in some arbitrary manner. These pressure limiting devices produce a non-continuous front-to-rear brake force relationship. Since the ratio of front-to-rear braking forces (and consequent hydraulic pressures) required for maximum vehicle deceleration on various types of road friction surfaces does not vary linearly with the tire coefficient of friction, and is a continuously varying ratio, none of these systems can provide optimum braking effect except at one or two values of coefficient of friction, and must necessarily produce non-optimum results for all other road conditions.

For a given vehicle configuration for each loading condition, the front and rear braking forces required for maximum deceleration may be determined as a function of tire coefficient of friction. Determination of the weight-transfer effect as well as the method of designing a braking system to match these optimum requirements is described in my co-pending patent application Ser. No. 708,880, filed Feb. 28, 1968 for METHOD FOR PRODUCING MAXIMUM VEHICLE DECELERATION. For a given configuration of wheel brake mechanisms including front and rear slave cylinder sizes, optimum values of concurrent front and rear hydraulic system pressure may now be established for each value of the coefficient of friction between the tires and the road for maximum deceleration, under each loading condition. It will be observed (see my co-pending patent application Ser. No. 708,880) that these pressures are not simple straight line relationships, but rather a family of continuous curves of a more complex nature. The values of hydraulic pressure are determined by the configuration of the vehicle in terms of wheel base, center of gravity including load distribution, and wheel brake mechanism and not by any arbitrary equalization, or non-equalization factor, within the braking system for proportioning the braking forces between front and rear. For simplification, it may be desirable to use equal front and rear hydraulic pressures near the low tire friction end where the optimum hydraulic pressures are substantially equal.

Obtaining the optimum pressure relationships described above for the hydraulic brakes of a motor vehicle is achieved, according to the present invention, by a proportioning device herein shown as a valve in FIGS. 1–3. The device includes a housing 10 having a high pressure inlet 12 and a regulated pressure outlet 14, the outlets each being equipped with hydraulic fittings as customarily employed on automobile hydraulic brake systems. The high pressure inlet 12 is supplied by the master cylinder in a single master cylinder system (not shown), or as in the split system illustrated in FIG. 1 by the rear wheel system master cylinder 16. Pressure fluid from the front wheel system master cylinder 18 is applied directly to the front wheel brakes 20, while pressure fluid from the regulated outlet 14 is applied to the rear wheel brakes 22. The housing 10, is shown in FIG. 3 attached to the firewall 23 of the vehicle, by screws 23', but may be attached at any convenient location.

According to the present invention, the fluid pressure supplied to the rear brakes 22 from the regulated outlet 14 is varied according to a predetermined function of the rear brake line pressure supplied from the master cylinder to the high pressure inlet 12, so as to vary the braking effect between front and rear wheels as vehicle deceleration changes. In keeping with the invention, the device is effective to vary the ratio of the brake line pressures between the front and rear brake lines as a non-linear function of vehicle deceleration. This function is predetermined, according to the method described in my co-pending application, to take into account the weight and center of gravity characteristics of the vehicle, and the braking characteristics of the wheel brake mechanism with which the vehicle is equipped, in order to thereby obtain optimum proportioning of braking force for maximum braking under all road conditions.

In carrying out the present invention, the ratio of front-to-rear brake line pressures is varied by regulating means, herein shown in FIGS. 1–3 including a valve for regulating the fluid pressure in the outlet 14 to the rear brake line. This regulation means is concurrently responsive to predetermined tire adhesion and weight transfer characteristics of the vehicle, and front and rear wheel brake mechanism characteristic of the vehicle. To this end, from the high pressure inlet 12, pressure fluid is directed through a conduit 24 into a first cylinder 26 containing a piston 28. Another conduit 30 carries high pressure fluid into a check valve chamber 32 containing a ball check valve 34 urged by a spring 36 into sealing contact with an opening 38 forming a seat for the ball and leading to a regulated pressure cylinder 40 containing a second piston 42. From the regulated pressure cylinder 40 a conduit 44 which bypasses the high pressure conduit 30 connects to the regulated pressure outlet 14. Both pistons 28, 42 are provided with seals 46 made of teflon or other low friction material and in the illustrated embodiment the pistons 28, 42 are constructed as a single coaxial piston shuttle 48 with the pressure faces of the pistons being oppositely disposed and of equal size so that the pressure forces on the shuttle from the high pressure cylinder 26 and the regulated pressure cylinder 40 are in direct opposition.

A pin 50 is carried by the second piston 42 which contacts the check valve ball 34. With the structure shown, high pressure forces on the first piston 28 tend to urge the piston shuttle 48 to the right while regulated pressure forces in the pressure cylinder 40 acting on the second piston 42 tend to urge the second piston 42 and thus the piston shuttle 48 to the left. In addition, when the ball 34 is seated, a resultant force tending to retain ball 34 on its seat 38 (due to high fluid pressure in the chamber 32, regulated fluid pressure in the chamber 40, and spring force from the spring 36) acts on the piston shuttle 48 through the pin 50 and tends to urge the piston shuttle 48 to the left. It will be observed that when the inlet pressure forces on the first piston 28 exceed the regulated pressure forces on the second piston 42 (and the resultant force on the ball 34) the piston shuttle 48 will be displaced to the right as seen in FIG. 1, moving the ball 34 off its seat 38 and allowing high pressure fluid from the conduit 30 to pass through the conduit 44 to the regulated pressure outlet 14.

The structure described thus far, without the addition of other elements of the invention, would operate in a known manner as a fixed ratio proportioning valve, with the ratio of pressures between the inlet 12 and outlet 14 being determined substantially by the ratio of the effective pressure areas of the pistons 28, 42 (in this case unity). Pursuant to the invention, however, there is provided means herein shown as a piston, spring, cam lever and connecting means assembly for applying a variable biasing force to the piston shuttle 48, for varying the proportioning ratio, and thus the front to rear braking effect as a function of front brake system pressure; the piston, spring, cam lever and connecting means assembly applies a predetermined non-linear biasing force which is representative of tire adhesion, weight-transfer, and wheel brake mechanism characteristics of the vehicle. This is accomplished, in the present case, by providing a conduit extension 52 carrying inlet pressure, equal to (or having a known relationship to) front wheel brake system pressure, to a third cylinder 54 containing a third piston 56. The third piston 56 has a low friction seal 58 of teflon or like material similar to the seals on the first and second pistons, and is received at its opposite end in a low friction bushing 60 in the housing 10 so it is freely slidable in the housing.

Pivoted to the third piston 56 is a cam lever arm 62. The cam lever arm 62 has at one end a hook 64 to which a biasing spring 66 is attached. At the other end, the cam lever arm 62 has a cam surface 68 which is urged by the biasing spring 66 against a connecting means consisting of a slotted lever arm 70 which is pivoted on a pin 72 attached to the housing 10 and applies a variable biasing force to the piston shuttle 48.

With a vehicle of known size, weight, load distribution and wheel brake mechanism, a biasing spring 66 is selected and the the shape of the cam surface 68 on the cam lever arm 62 is determined so that the contact point of engagement with the slotted lever arm 70 is moved in response to front wheel brake system pressure represented by the motion of the third piston 56 in a manner which varies the biasing force applied to the piston shuttle 48. In this way, the front and rear brake pressures are varied as necessary to match the previously determined optimum front and rear brake pressure relationship and thereby match the optimum concurrent braking forces for both front and rear wheels during all conditions of maximum braking effort, according to the coefficient of friction available at the road surface.

To connect the slotted lever arm 70 with the piston shuttle 48 in a manner that allows free and easy motion of the piston shuttle, the lever arm 70 is preferably constructed with a tapering tip terminating in a ball 73 which is received within a bore 74 in the slidable piston shuttle 48. The biasing spring 66 is anchored to the housing 10 on a support bar 76, and exerts a force tending to move the cam lever arm 62 clockwise as seen in FIG. 1. The cam surface 68 of the cam arm 62 is thus urged to the right, and (in the position shown in solid lines) contacts the slotted lever arm 70 at point A. The slotted lever arm 70 is thereby urged in a counterclockwise direction, urging the pistons shuttle 48 to the left and reducing the force tending to unseat the ball 34.

In operation, with a relatively low initial inlet hydraulic pressure representing low manual effort on the brake pedal and low total braking forces, the piston, spring, cam lever and connecting means elements will assume the positions shown in solid lines in FIG. 1, with the contact point being at A. It can be seen from FIG. 1 that in this position the mechanical advantage of the biasing spring 66 in acting to move the piston shuttle 48 to the left is small, because the contact point A is toward the tip of the cam lever arm 62, and near the pivot of the slotted lever arm 70. At higher pressures representing high total braking forces, however, the third piston 56 will move to the right as seen in FIG. 1, shifting the cam lever arm 62 to some alternate position as indicated in phantom and moving the contact point to B. Here the contact point is in a position which gives the biasing spring 66 a greater mechanical advantage in urging the piston shuttle 48 to the left, increasing the biasing force by an amount greater than the increase in the force of the spring 66 and thus the proportioning of the hydraulic pressures achieved by the device will be correspondingly different. As the biasing force on the piston shuttle 48 is enhanced through the movement of the third piston 56 to the right under increased inlet pressure, the ratio of inlet to outlet pressures will become greater; that is, the outlet pressure to the vehicle's rear brakes will be diminished in a non-linear manner as a function of total braking forces.

As a further feature of the invention, means are provided for adjustment of the proportioning ratio for different vehicle loadings, herein shown as means for selectively adjusting the biasing force through the use of a rotatable end cap 77 carried on a cylindrical extension 78 of the housing 10 in which the biasing spring 66 is contained. The bar 76 to which the biasing spring 66 is attached extends through a pair of elongate slots 80 on opposite sides of the cylindrical body extension 78 as shown in FIG. 2 and is movable axially therein. The rotatable end cap 77 contains similar elongate slots 82, but these are disposed at an angle to the slots 80 in the housing extension 78 so that rotation of the end cap 77 cams the bar 76 axially according to the direction of cap rotation. If desired, rotation of the end cap 77 may be accomplished remotely by the provision of a cable or Bowden wire on an operation lug 84 provided for this purpose. The control head for the cable attached to lug 84 may be placed in reach of the driver and marked for number of passengers, baggage, fuel, etc. for easy adjustment whenever these factors change.

Screw 86 is provided to permit unrestricted fluid flow for bleeding air from the hydraulic system of the vehicle whenever it is opened for repair, or other purposes. The screw 86 is inserted until it deflects the slotted lever arm 70 to its full clockwise position thus moving the piston shuttle 48 to the right in FIG. 1 and lifting the check valve ball 34 from its seat. After completing air bleeding operations, screw 86 is partially withdrawn until it clears slotted lever arm 70 in all positions and is then retained in this position by tightening locknut 88.

A proportioning device constructed according to this invention is suitable for use in an automotive vehicle brake system provided with a conventional master cylinder having a single plunger (not shown) connected to a brake pedal for direct actuation. In such case, the high pressure inlet 12 of the device is supplied from the brake line leading from the master cylinder to the front wheel brakes, and the regulated pressure outlet 14 is connected to the rear wheel brake. The device is thus effective to vary the proportioning ratio between the fluid pressure applied to the front wheel brakes, and the fluid pressure applied to the rear wheel brakes, in accordance with a predetermined function of inlet pressure dependent upon tire adhesion, weight transfer and wheel brake mechanism characteristics of the vehicle, as defined by the spring 66 and the profile of the cam surface 68. Further, a number of similar front and rear fluid pressure proportioning ratio programs are formed by the operation of the end cap 77 to match the requirements caused by variations in disposable load in the vehicle.

While the master cylinder of FIG. 1 is shown directly manually actuated, it will be understood that the device of the present invention is suited for installation in a power brake system, as for example an automotive braking system provided with a power booster controlled by the brake pedal and connected for operating a master cylinder or having one incorporated therein, or a full power system in which the hydraulic pressure is supplied by a power operated pump and controlled by a manually operated valve.

In the form of the device shown in FIG. 1, the front and rear braking systems are completely separate; the device contained in housing 10 is located within the rear braking system; and in the event of loss of fluid in one system, the other will be available to stop the vehicle upon brake pedal actuation. For example, should the front system lose fluid and become inoperative, it will be observed that the device will continue to operate and will supply a diminished pressure to the rear wheel brakes which is a function of inlet pressure. This diminished fluid pressure will still be effective to operate the rear brakes to stop the vehicle. This is the preferred configuration since, when only the rear brakes are operative, there is a tendency on the part of the operator to apply excessive force to the brake pedal and thus slide the wheels.

Figure 6:
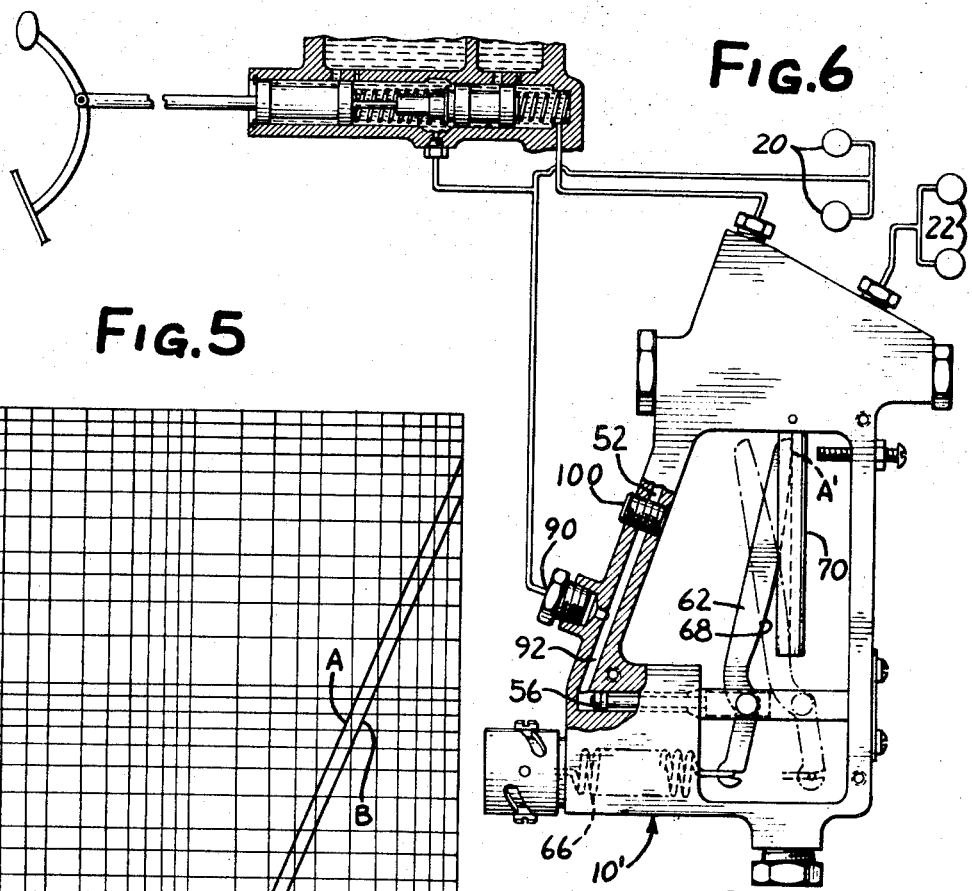
FIG. 6 is a view similar to FIG. 1 of a modified device in an alternative braking system arrangement.

Referring now to FIG. 6, an alternative form of the invention is shown, involving a variable proportioning device contained in housing 10' in a split system (as in FIG. 1) with separate front and rear braking systems supplied by master cylinder pistons of a dual master cylinder.

In the form of device contained in housing 10' shown in FIG. 6, the device is located in both front and rear braking systems, although there is no hydraulic flow connection between the systems, and thus their separation hydraulically is maintained. In the event of loss of fluid pressure in the front braking system in such an arrangement, piston 56 will not be actuated and the rear braking system will receive full master cylinder pressure, rather than a diminished pressure as in the case of the form of the invention shown in FIG. 1.

Referring specifically to FIG. 6, the device contained in housing 10' is essentially the same construction shown in FIG. 1, with the exceptions that a hydraulic inlet 90 is provided to supply pressure fluid through a conduit 92 directly to the pressure control piston 56 from the front braking system 20, and the passage 52 which is used to convey pressure fluid to the control piston from the high pressure inlet in the device of FIG. 1 is blocked by means herein shown as a plug 100. By blocking this passage, the front and rear braking systems 20, 22 are maintained separate for independent operation in case of loss of hydraulic fluid in either system. But with this arrangement, in the event of loss of front brake line pressure, the spring 66 (see also FIG. 1) becomes effective to move the control piston 56 to the left causing the contact point of engagement A' between the cam surface 68 on the cam lever arm 62 to move to the tip of the cam lever arm 62 and near the pivot of the slotted lever arm 70. In this position, as in the condition of low manual effort on the brake pedal and low total braking forces, the piston, spring, cam lever anc connecting means elements will assume the positions shown in solid lines in FIG. 6, and the mechanical advantage of the biasing spring 66 in acting to move the piston shuttle 48 to the left is small. As the pressure produced by the rear brake master cylinder increases, since it acts directly on the first piston 28 through the high pressure inlet of the device contained in housing 10', the increasing pressure will shift the piston shuttle 48 to the right, in effect holding the ball valve 34 open and supplying substantially full master cylinder pressure to the rear braking system 22.

Figure 5:
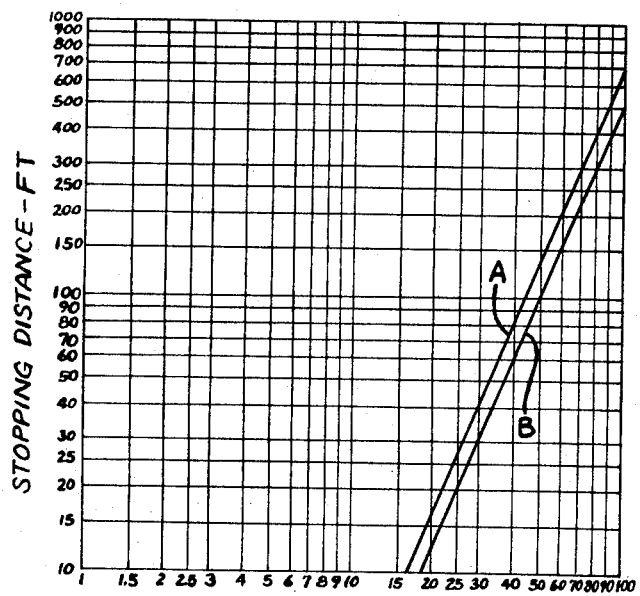
FIG. 5 is a graph showing stopping distances at different vehicle speeds for an automobile having a braking system equipped with a device constructed as shown in FIG. 1 and also showing stopping distances for the same automobile not so equipped.

Now turning to FIGS. 4 and 5, these are graphs depicting, in the case of FIG. 4, design and performance input vs. output pressure curves for a device constructed as shown in FIG. 1 and illustrating the nonlinear pressure relationship and the low hysteresis in the operation of the device; and in the case of FIG. 5, stopping distances at different speeds for a vehicle having a braking system with and without a device constructed as shown in FIG. 1.

Referring to FIGS. 4 and 5, a device was constructed as shown in FIG. 1 for use in the braking system of a 1968 Ford Mustang. The steps of the method described in my co-pending application Ser. No. 708,880 entitled "METHOD FOR PRODUCING MAXIMUM VEHICLE DECELERATION" were followed. Having determined the weight-transfer characteristics of this vehicle and the pressure-braking force characteristics of its braking system, a cam profile 68 for this particular automobile was calculated to produce, in the operation of the device, ratios of front-to-rear braking pressure at different values of rear brake line pressure which obtain optimum braking effect for both front and rear wheels according to the coefficient of friction available at the road surface. These pressures are shown as the middle of the three curves of FIG. 4 and are the design point values for the device.

The fluid pressures controlled by the device will lie within a hysteresis band caused by the delay in opening and closing the check valve ball 34 due to the resultant forces on the ball 34 and to friction inherent in all moving mechanisms. Based on pressure, spring and friction force data for the parts of the device, the upper and lower curves were added to FIG. 4 to define the hysteresis band within which the device should operate. Upon completion, the device was tested and confirmed both the non-linearity of the performance curve and the narrowness of the hysteresis band. The test points shown on FIG. 4 were random points taken without regard for increasing or decreasing pressure. The rotatable end cap 76 was in the mid-position thus placing the biasing spring 66 in the design point position. Other tests showed that rotating the end cap increased or decreased the level of the hysteresis band in direct proportion to the inlet pressure without changing its width.

The device was installed in the braking system of the 1968 Mustang and tests conducted to determine the minimum possible stopping distance on a given section of dry paved roadway with and without the device operating. Since stopping distance is proportional to velocity squared, FIG. 5 is plotted on a log-log scale to permit connecting points with a straight line for maximum accuracy. Values shown in FIG. 5 are the lowest obtainable without sliding the tires from a number of runs at each speed. (Sliding tires increase stopping distance and produce loss of control.) Curve A shows results comparable to those obtainable with a manufacturers standard brake system, these results being obtained by blocking the check valve ball 34 in the open position. Curve B shows the results obtained with the proportioning device of the present invention fully operative. Distances were measured by means of an American Automobile Association inertia type detonator marked and a steel tape line. Speeds were measured by the standard automobile speedometer which was calibrated by stop watch against an officially measured mile of highway before and after testing. A 26 percent reduction in stopping distance when the device is operative is shown.

I claim as my invention:

1. A variable ratio proportioning device comprising in combination: a housing containing a piston and cylinder connected to an inlet for pressure fluid on one side and to an outlet for pressure fluid on the other side; means for applying a biasing force to the piston; means for varying the magnitude of the biasing force as a predetermined, non-linear function of the inlet fluid pressure; and means controlled by said piston for admitting fluid from the inlet to the outlet of the device and providing an outlet fluid pressure which varies according to said predetermined, nonlinear function of the inlet fluid pressure.

2. A variable ratio proportioning device comprising in combination: a housing containing a first piston and cylinder connected to an inlet for pressure fluid, a second piston and cylinder connected to an outlet for pressure fluid, said pistons being oppositely disposed with inlet fluid pressure force on the first piston acting in opposition to the outlet fluid pressure force on the second piston; means for applying a biasing force to the first piston modifying the inlet fluid pressure force acting thereon; means for varying the magnitude of the biasing force as a non-linear function of the inlet fluid pressure; valve means for admitting pressure fluid from the inlet to the outlet; and means connecting the second piston to open the valve means when the fluid pressure force plus biasing force on the first piston exceeds the fluid pressure force on the second piston, so that the outlet pressure varies as a non-linear function of the inlet fluid pressure.

3. A device as defined in claim 2 in which the valve means consists of a ball check valve seating against an opening leading to the second cylinder, and the means for opening the valve means including a pin located in said opening for urging the ball from its seat, said pin being actuated by relative motion of the piston and the cylinder.

4. A device as defined in claim 2 in which the means for applying and varying a biasing force includes a baising spring, and a third piston and cylinder connected to the inlet, said third piston carrying a first pivoted lever arm connected at one end to the biasing spring and at the other end to connecting means for transferring said biasing force to the second piston.

5. A device as defined in claim 4 in which the connecting means includes a second pivoted lever arm contacting the first and second pistons and the first lever arm with one of said lever arms having a cam surface of predetermined profile at the contact point, whereby said contact point is shifted with respect to the pivots of the first and second lever arms according to displacement of the third piston to vary the biasing force according to the inlet fluid pressure force as modified by the interaction of the biasing spring and the cam profile.

6. A device as defined in claim 4 in which the end of the said biasing spring opposite the first lever arm is carried on an anchor in the housing, and including adjustment means for selectively adjusting the position of the anchor whereby the force of the biasing spring at any position of the said third piston may be varied for modifying the outlet fluid pressure characteristics of the device.

7. A device as defined in claim 6 in which the anchor consists of a bar retained in an elongate slot in a cylindrical portion of the housing, and the adjustment means includes a rotatable end cap receiving said bar in an elongate slot at an angle to the slot in the housing, said cap having calibrations whereby rotation of the cap is effective to adjust the position of the bar for varying the force of the biasing spring according to predetermined values.

8. For use on a vehicle having front and rear wheels and given tire adhesion and weight-transfer characteristics on braking, given vehicle loading, and front and rear fluid pressure operated brakes for braking the wheels, a proportioning device as defined in claim 1 in which the inlet is connected to the front brakes and the outlet is connected to the rear brakes, and in which the said means for varying the biasing force includes a cam and defines the non-linear function by which the outlet fluid pressure varies from the inlet fluid pressure, said cam having a profile which is predetermined according to the given tire adhesion, weight-transfer and front and rear brake mechanism characteristics of the vehicle.

9. For use on a vehicle having front and rear wheels and given tire adhesion and weight-transfer characteristics on braking, given vehicle loading, and front and rear fluid pressure operated brakes for braking the wheels, a proportioning device as defined in claim 6, in which the inlet receives fluid at a pressure varying as a function of front brake pressure fluid, the outlet supplies pressure fluid to said rear brakes, and said piston, spring, cam lever and connecting means elements define the non-linear function by which the outlet fluid pressure varies from the inlet fluid pressure, said cam lever having a profile which is predetermined according to the given tire adhesion, weight-transfer and front and rear brake mechanism characteristics of the vehicle and said bias spring adjusting means being provided for further modifying outlet fluid pressure according to the given vehicle loading.

10. In a vehicle brake system having fluid pressure generating means, front and rear wheel brakes, and front and rear brake lines for transmitting fluid pressure to said front and rear wheel brakes respectively from said pressure generating means: a pressure proportioning device connected in said rear brake line, said device including regulating means for regulating the fluid pressure transmitted through said rear brake line to said rear wheel brakes as a predetermined non-linear function of fluid pressure supplied from said fluid pressure generating means, said predetermined function representing tire adhesion, weight-transfer and front and rear wheel brake mechanism characteristics of the vehicle, said regulating means being operable to regulate the fluid pressure in said rear brake line so as to increase the ratio of front to rear braking effort upon increase in total braking force according to said predetermined function.

11. In a vehicle brake system having front and rear master cylinders, front and rear wheel brakes, and front and rear brake lines for transmitting fluid pressure to said front and rear wheel brakes respectively from said front and rear master cylinders: a pressure proportioning device connected in said rear brake line, said device including regulating means for regulating the fluid pressure transmitted through said rear brake line to said rear wheel brakes as a predetermined non-linear function of fluid pressure supplied from said rear master cylinder, said predetermined function representing tire adhesion, weight-transfer and front and rear wheel brake mechanism characteristics of the vehicle, said regulating means being operable to regulate the fluid pressure transmitted to said rear brake line so as to increase the ratio of front to rear braking effort upon increase in total braking force according to said predetermined function.

12. In a vehicle brake system having front and rear master cylinders, front and rear wheel brakes, and front and rear brake lines for transmitting pressure fluid to said front and rear wheel brakes respectively from said front and rear master cylinders; a pressure proportioning device including regulating means concurrently responsive to predetermined tire adhesion and weight-transfer characteristics of the vehicle and front and rear wheel brake mechanism characteristics of the vehicle, said regulating means being operable to regulate the fluid pressure in said rear brakes so as to increase the ratio of front to rear braking effort upon increase in total braking force as a function of said characteristics under normal operating condition, and means responsive to a loss in front brake line pressure for shifting said regulating means to pass substantially full rear brake line pressure to said rear wheel brakes.

13. In a proportioning device for regulating an outlet fluid pressure of the type comprising a housing having an inlet passage for receiving and returning a pressure fluid, the pressure of which is variable, an outlet passage for receiving and returning pressure fluid, a regulating check valve controlling fluid flow between the inlet passage and the outlet passage, and arranged to close against the flow to the outlet passage and permit flow by opening of the valve from the outlet to the inlet; the improvement of a dual piston cooperating with the valve and having opposed reaction areas subjected to the fluid pressures in the inlet and outlet passages, and a variable resilient biasing means constructed and arranged to react on the piston in opposition to the inlet fluid pressure, including a second single piston having a third control area, the movement of which controls the programming of a number of predetermined non-linear inlet to outlet fluid pressure relationships through the action of said biasing means.

* * * * *